US007752009B2

(12) United States Patent
Nicolas et al.

(10) Patent No.: US 7,752,009 B2
(45) Date of Patent: Jul. 6, 2010

(54) METHOD AND APPARATUS FOR CHECKING THE HEIGHT OF A MAIL ITEM ON THE FLY FOR FRANKING PURPOSES

(75) Inventors: Christian Nicolas, Chatuzange le Goubet (FR); Didier Painault, Bagnolet (FR)

(73) Assignee: NEOPOST Technologies, Bagneux (FR)

( * ) Notice: Subject to any disclaimer, the term of this patent is extended or adjusted under 35 U.S.C. 154(b) by 1531 days.

(21) Appl. No.: 11/045,917

(22) Filed: Jan. 28, 2005

(65) Prior Publication Data

US 2005/0187887 A1 Aug. 25, 2005

(30) Foreign Application Priority Data

Jan. 30, 2004 (FR) .................................. 04 00934

(51) Int. Cl.
*G01B 11/02* (2006.01)
*G01B 11/00* (2006.01)
*G06F 19/00* (2006.01)
*G07B 17/00* (2006.01)

(52) U.S. Cl. ................. 702/158; 198/502.2; 250/360.1; 250/559.12; 250/559.24; 356/635; 356/638; 382/101; 702/166; 705/402

(58) Field of Classification Search ................... 33/1 R, 33/700, 701, 772, 773, 776; 73/432.1, 865.8; 198/502.1, 502.2, 617; 250/200, 358.1, 359.1, 250/360.1, 491.1, 559.01, 559.12, 559.19, 250/559.24, 559.26; 356/625, 635, 638; 382/100, 101; 702/1, 127, 155, 158, 159, 702/163, 166, 189; 705/400, 401, 402, 406, 705/410

See application file for complete search history.

(56) References Cited

U.S. PATENT DOCUMENTS 3,436,968 A * 4/1969 Unger et. al. ................. 73/433
3,513,444 A * 5/1970 Miller et. al. ............... 356/627
3,588,480 A * 6/1971 Unger et al ................. 702/156
4,773,029 A * 9/1988 Claesson et al. ............ 702/167
4,905,512 A * 3/1990 Hayashi ........................ 73/169
5,042,015 A * 8/1991 Stringer ........................ 367/99
5,220,536 A * 6/1993 Stringer et al. ................ 367/99
5,331,118 A * 7/1994 Jensen ...................... 177/25.14
5,422,861 A * 6/1995 Stringer et al. ................ 367/99
5,469,262 A * 11/1995 Keen et al. .................. 356/639

(Continued)

FOREIGN PATENT DOCUMENTS

EP 0 871 145 A2 3/1998

*Primary Examiner*—Edward R Cosimano
(74) *Attorney, Agent, or Firm*—Sughrue Mion, PLLC

(57) ABSTRACT

A method of checking the height of a mail item relative to at least one dimensional threshold SH defining a change in postage. The mail items are advanced at a constant speed V along a reference surface. The presence of a mail item is detected relative to a given point of the reference surface. First and second times $t_1$, $t_2$ for which the same mail item is present at the first and second distances $d_1$, $d_2$ relative to the reference surface is detected. The ratio $t_2/t_1$ is compared with a value equal to $(1-\epsilon)$, where $\epsilon$ represents a correction coefficient of less than 1 that depends on the tolerances for detection of the presence of a mail item. The height of a mail item is considered greater than the dimensional threshold SH if, and only if, the relationship $t_2/t_1>1-\epsilon$ is true.

8 Claims, 4 Drawing Sheets

U.S. PATENT DOCUMENTS 5,535,127 A 7/1996 Uno et al. .............. 364/464.02
5,699,161 A * 12/1997 Woodworth ................. 356/628
5,808,912 A 9/1998 Dlugos et al. ............... 364/562
5,923,428 A * 7/1999 Woodworth ................. 356/623
5,991,041 A * 11/1999 Woodworth ................. 356/602
6,006,210 A * 12/1999 Freeman et al. ............. 705/402
6,137,577 A * 10/2000 Woodworth ................. 356/623
6,169,978 B1 1/2001 Lutz et al. ................... 705/406
6,832,213 B2 * 12/2004 Freeman et al. ............. 705/410
7,403,900 B2 * 7/2008 Cooper et al. .................. 705/1

* cited by examiner

FIG.1
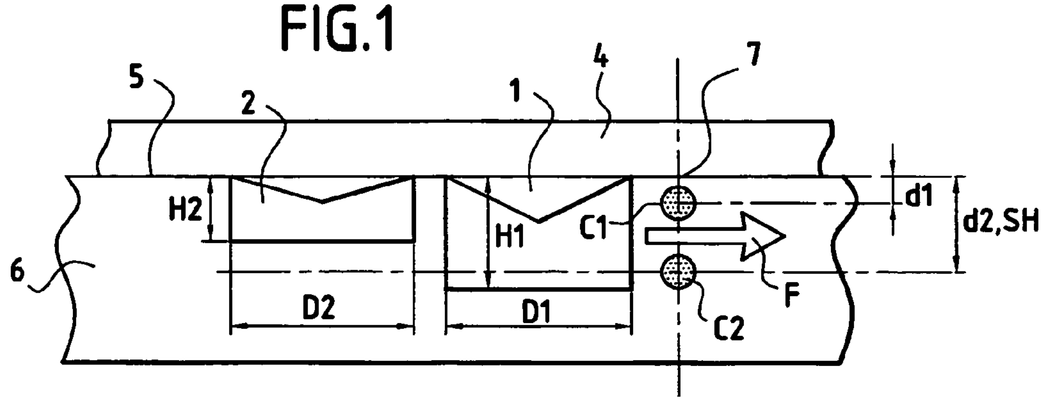
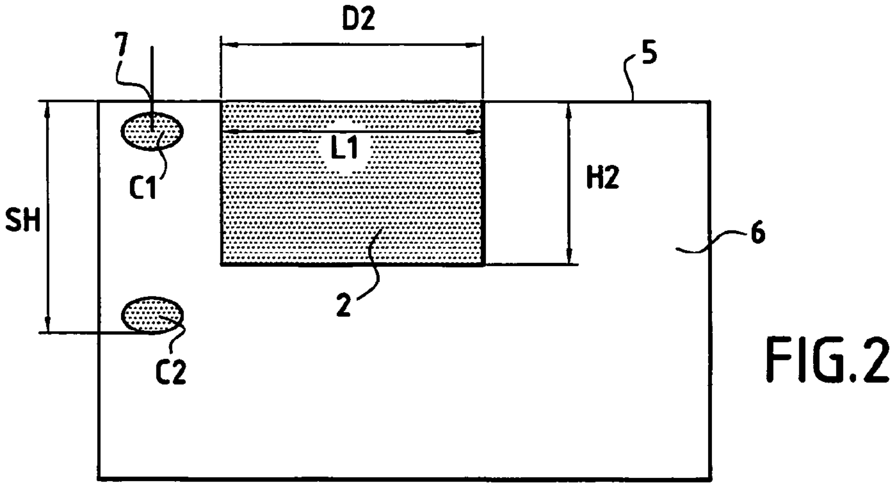
FIG.2
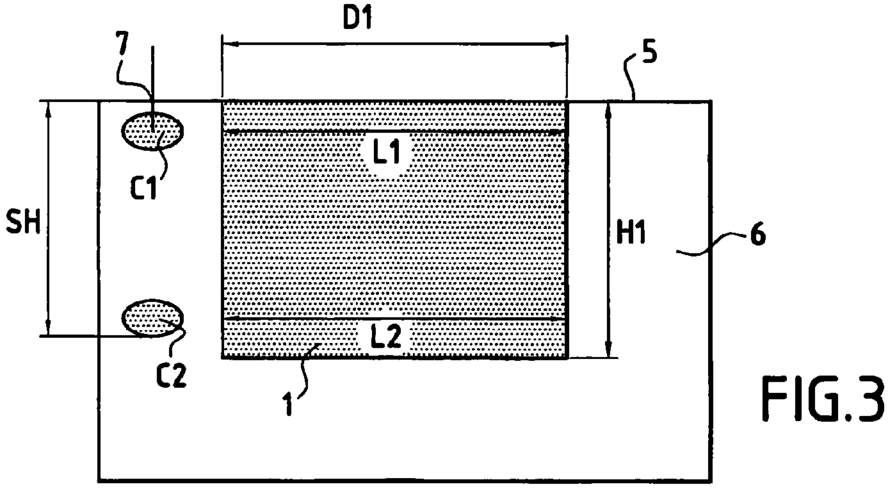
FIG.3

METHOD AND APPARATUS FOR CHECKING THE HEIGHT OF A MAIL ITEM ON THE FLY FOR FRANKING PURPOSES

CROSS-REFERENCE TO RELATED APPLICATIONS

This applications claims priority from French Patent Application No. 04 00934 filed Jan. 30, 2004.

The present invention relates to the field of mail handling. In particular it relates to a franking system which includes simple apparatus for checking the height $H_i$ of a mail item relative to at least one dimensional threshold SH defining a category for postal charging purposes.

BACKGROUND OF THE INVENTION

A mail-handling machine equipped with a dimensional rating capability is already known, e.g. from U.S. Pat. No. 6,006,210 (Pitney Bowes).

That machine provides actual measurement of the height of the mail item by means of a strip of diodes. However, that apparently simple solution is extremely costly in practice. It assumes the use both of a very long strip and also of means for guaranteeing that the mail item is properly aligned or "jogged", i.e. that it is not skew relative to the reference face of the machine.

In practice, unless other generally complex positioning devices are also used, mail items are often skew, and the amplitude of the skew depends on the type of the machine and on the type of item being conveyed.

U.S. Pat. No. 6,169,978 (Siemens) discloses a sophisticated system for determining the dimensions of the item being conveyed in order to assign a precise postage amount to it. That system also assumes that all of the items conveyed are positioned properly relative to a reference. Otherwise, the dimensional measurements are erroneous, and so are the postage amounts.

OBJECTS AND SUMMARY OF THE INVENTION

An object of the invention is to remedy the above-described drawbacks and to make it possible to check the height $H_i$ of a mail item on the fly for franking purposes, without it being necessary to measure said height $H_i$ exactly, or to position the mail item in accurately "jogged" manner, i.e. in a position in which it is exactly parallel to the reference surface of the machine from which the checking or the measurements are effected.

An object of the invention is thus to implement a simple method and to provide apparatus that is inexpensive while also being reliable, and that, without using complex technical apparatus, makes it easy, with a moving mail item (i.e. on the fly), to determine which category of postal charge should be applied to said mail item, as a function of the value of a given dimension, such as the height, of said mail item.

The invention achieves these objects by means of a method of checking the height $H_i$ of a mail item on the fly and for franking purposes relative to at least one dimensional threshold SH defining a change in postage, each mail item having longitudinal peripheral edges of length $D_i$ and transverse peripheral edges of height $H_i$; which method consists in: causing the mail items to advance at a constant speed V along a reference surface so that each mail item is in contact with said reference surface over at least a portion of one of its longitudinal edges; detecting the presence of a mail item relative to a given point of the reference surface firstly at a first distance $d_1$ close to the reference surface and measured perpendicularly thereto, and secondly at a second distance $d_2$ further away from the reference surface, measured perpendicularly thereto, and corresponding to said dimensional threshold SH; detecting first and second times of presence $t_1$, $t_2$ for which the same mail item is present at said first and second distances $d_1$, $d_2$ relative to the reference surface; comparing the ratio $t_2/t_1$ between the second and first times of presence at the second distance $d_2$ and at the first distance $d_1$ with a value equal to $(1-\epsilon)$, where $\epsilon$ represents a correction coefficient of less than 1 that depends on the tolerances for detection of the presence of a mail item; and considering that the height H of a mail item is greater than the dimensional threshold SH if, and only if, the relationship $t_2/t_1>1-\epsilon$ is true.

Advantageously, the coefficient $\epsilon$ lies approximately in the range 0.005 to 0.05, and preferably in the vicinity of 0.01.

In addition, the method may further consist in determining the length $D_i$ of a mail item on the basis of the time of presence $t_1$ and of the speed of advance V of the mail items.

The invention also provides apparatus for checking the height $H_i$ of a mail item relative to at least one dimensional threshold SH on the fly and for franking purposes, said at least one dimensional threshold defining a change in postage, each mail item having longitudinal peripheral edges of length $D_i$ and transverse peripheral edges of height $H_i$; which apparatus comprises: a conveyor for conveying mail items as laid flat at a constant speed V along a guide defining a reference surface parallel to the direction of advance of the mail items placed on the conveyor; jogger means for placing each mail item in contact with said reference surface over at least a portion of one of its longitudinal edges; a first detector device that is rendered active when the presence of a mail item is detected relative to a given point of the reference surface at a first distance $d_1$ close to the reference surface and measured perpendicularly thereto; at least one second detector device that is rendered active when the presence of a mail item is detected relative to a given point of the reference surface at a second distance $d_2$ further away from the reference surface, measured perpendicularly thereto, and corresponding to said dimensional threshold SH; a counter device for counting first and second times of presence $t_1$, $t_2$ for which the first and second devices are rendered active as a mail item is going past; and a computer and comparator device for computing the ratio $t_2/t_1$ between said second and first times $t_2$, $t_1$, for comparing said ratio $t_2/t_1$ with a threshold value equal to $(1-\epsilon)$, where $\epsilon$ represents a correction coefficient of less than 1 that depends on the tolerances for detection of the presence of a mail item, and for delivering information indicating that the height $H_i$ of a mail item is greater than the dimensional threshold SH if, and only if, the relationship $t_2/t_1>1-\epsilon$ is true.

The coefficient $\epsilon$ lies approximately in the range 0.005 to 0.05, and preferably in the vicinity of 0.01.

The first and second detector devices comprise optical sensors.

In a particular embodiment, the counter device comprises at least one optical encoder.

The apparatus further comprises a device for computing the length $D_i$ of a mail item on the basis of the first time of presence $t_i$ and of the speed V of advance of the mail items.

The invention also provides a system for determining postage amounts for franking mail, said system including apparatus for measuring the weights and dimensions of mail items, including apparatus as defined above for checking the height $H_i$ of a mail item on the fly.

BRIEF DESCRIPTION OF THE DRAWINGS

Other characteristics and advantages of the invention appear from the following description of particular embodiments given by way of example, and with reference to the accompanying drawings, in which:

FIG. 1 is a diagrammatic plan view showing the principle of a method and apparatus for checking the dimensions of a mail item on the fly for franking purposes, which method and apparatus implement the invention;

FIGS. 2 to 5 show various examples of determining the dimensions of a mail item by using the method of the invention;

MORE DETAILED DESCRIPTION

Figure 4:
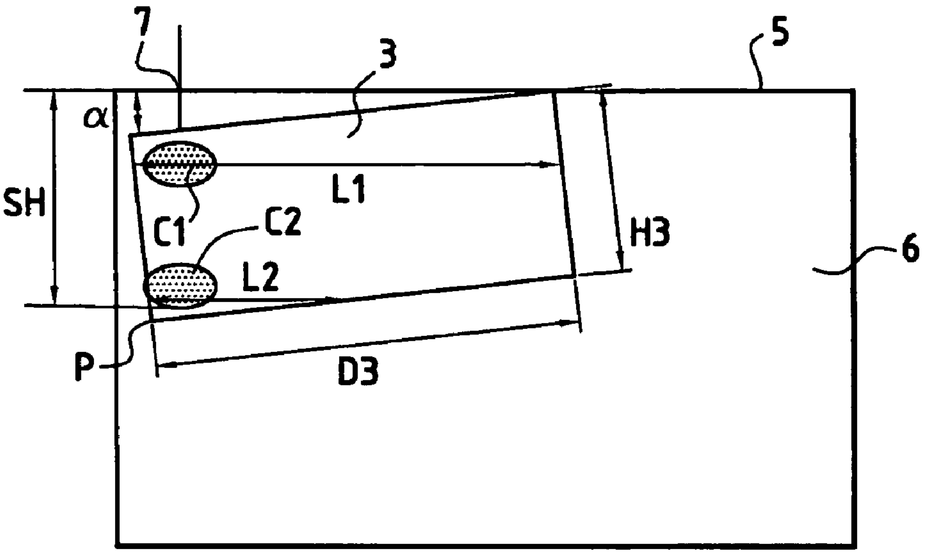

Determining postal charges for mail items is based on criteria of mail item weight and mail item dimensions (thickness, length, and height of the envelope).

Therefore, it is necessary:

- either to check that the dimensions of the envelope are greater than thresholds;
- or to check that the ratio between the length and the height lies within two boundary values (e.g.: 1.3<R<2.5 for the USA, and R<square root of 2 for Germany).

In order to attribute the appropriate postage automatically to each envelope in a non-uniform batch, apparatus is disposed upstream from the postage meter, which apparatus measures the weight and the dimensions of each envelope and transmits this information to a postal charge computer. For this purpose, the dimensions are measured by suitable sensors disposed in the path of the envelopes between the feeder and the franking base.

In the invention, the height $H_1$, $H_2$ of an envelope 1, 2 relative to a predefined threshold SH can be checked very simply whenever an envelope 1, 2 laid flat on a belt 6 of a conveyor moving at a constant speed V in the direction indicated by arrow F in FIG. 1, is jogged at least in part against an envelope guide 4 having a reference surface 5 that is parallel to the direction in which the envelopes 1, 2 advance, i.e. means are provided for placing each item 1, 2 in contact with the reference surface 5 over at least a portion of one of its longitudinal edges of length $D_1$, $D_2$.

Figure 5:
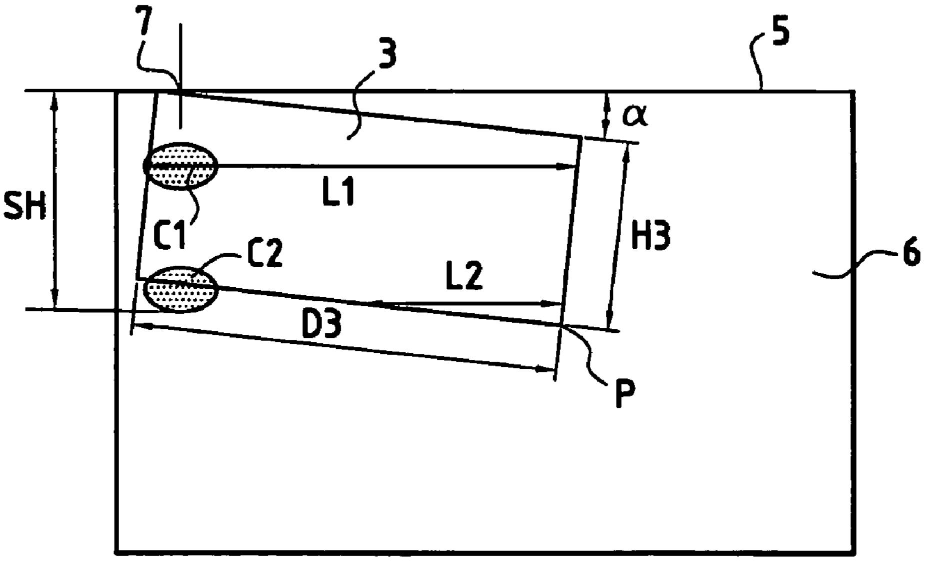

It should be noted that although the invention requires jogging over at least a portion of the length of a mail item, it makes it possible, without implementing mechanical means for repositioning the envelopes, to solve the problem of envelopes which, in practice, are not positioned exactly in alignment, but rather slightly skew, as shown in FIGS. 4 and 5, without the skew being too marked. In practice, the invention takes account of envelopes whose longitudinal edges can form an angle $\alpha$ relative to the reference surface 5 that is approximately in the range 0° to 5°, be they skew envelopes 3 whose trailing edges are further away from the reference surface (FIG. 4) or skew envelopes 3 whose leading edges are further away from reference surface 5 (FIG. 5).

The dimensions of each of the envelopes 1, 2, 3 (FIGS. 1 to 5), i.e. the length $D_1$, $D_2$, $D_3$, and whether the height $H_1$, $H_2$, $H_3$ is greater than or less than at least one threshold SH can be determined simply by means of measurement devices that can be constituted merely by sensors $C_1$, $C_2$ that change state when an envelope goes past them.

In FIG. 1, it can thus be seen that the envelope 1 is about to go past both of the sensors $C_1$, $C_2$ placed in stationary manner facing the paths along which the belt 6 of the conveyor advances, whereas the envelope 2 of height $H_2$ smaller than the height $H_1$ of the envelope 1 will subsequently go past the sensor $C_1$ only.

The sensors $C_1$ and $C_2$ are placed relative to a given point 7 of the reference surface 5 and along a line perpendicular to the belt 6 of the conveyor, respectively at a distance $d_1$ close to the reference surface 5, measured perpendicularly thereto, and at a distance $d_2$ further away from the reference surface 5, measured perpendicularly thereto, and corresponding to a dimensional threshold SH relative to which it is desired to determine whether or not the height $H_1$, $H_2$, $H_3$ or a mail item 1, 2, 3 is greater.

As regards the height (or width) of a document or mail item 1, 2, 3, the object is not actually to measure this magnitude, but rather merely to determine whether or not said magnitude is greater than the predefined threshold SH.

As it travels on the belt 6 advancing past the reference surface 5, an envelope 1, 2, or 3 goes past the first sensor $C_1$ which itself, when it detects the presence of an envelope, triggers counting of pulses delivered, for example, by an optical encoder. The number of pulses, i.e. the time $t_1$ for which the sensor $C_1$ detects the presence of an envelope, makes it possible, inter alia, to deduce the length $D_1$, $D_2$, $D_3$ of the envelope 1, 2, or 3, provided that the constant speed V of advance of the belt 6 is known.

In the same way, when the sensor $C_2$ detects the presence of an envelope 1, 2, or 3, said sensor $C_2$ triggers counting of pulses delivered, for example, by an optical encoder. The number of pulses, i.e. the time $t_2$ for which the sensor $C_2$ detects the presence of an envelope makes it possible to define a length $L_2$ over which the sensor $C_2$ is masked by an envelope 1, 2, or 3, and above all, in combination with the time $t_1$ (or the length $L_1$), to determine reliably whether an envelope does in fact have a height $H_1$ greater than a predefined threshold SH.

Comparison of the times $t_2$ and $t_1$ (or of the lengths $L_2$ and $L_1$) determined on the basis of detecting activation of the sensors $C_1$ an $C_2$, makes it possible to check that the threshold being exceeded is not due to improper positioning of an envelope, which is skew.

It is thus important to check that the value $t_2$ is close to the value $t_1$ (or that the value $L_2$ is close to the value $L_1$).

The ratio $t_2/t_1$ is thus compared with a value equal to $1-\epsilon$, where $\epsilon$ represents a correction coefficient less than 1 depending on the tolerances of the detectors $C_1$, $C_2$ and on the dimensions of envelopes of the same format, and it is considered that the height $H_1$ (e.g. $H_1$, $H_2$, $H_3$) of an item (e.g. 1, 2, 3) is greater than the threshold SH if, and only if, the relationship $t_2/t_1>\epsilon$ is true.

The value $\epsilon$ can advantageously be about 0.01, but it can also lie approximately in the range 0.005 to 0.05.

As indicated above, a threshold SH being exceeded results, in many cases, in a change in the postage amount to be applied, regardless of the weighed or estimated weight of the mail item.

It is thus important that the threshold SH is not artificially considered as being exceeded due to skew positioning that temporarily activates the sensor $C_2$.

The fact that the height H (or width) of a mail item is detected by monitoring activation of the sensor $C_2$ continuously over a period of time makes it possible to guarantee, by means of comparison with the same monitoring performed on activation of the sensor $C_1$, that the threshold really has been exceeded.

For example, if an envelope 3 is skew by an angle $\alpha$ (FIGS. 4 and 5), with a coefficient of tolerance $\epsilon=0.01$, if $t_2/t_1<0.99$, it is considered that the threshold SH has not been exceeded, whereas a prior art system for measuring or estimating envelope width would reach the opposite conclusion. The bottom point P that is furthest away from the reference surface 5 of the envelope guide 4 finds itself at a distance greater than SH from the reference surface 5 (jogging surface). Taking account of the fact that the sensor $C_2$ detects (by optical masking) said width or height $H_3$ over the entire length $D_3$ of the mail item constitutes means for verifying that threshold has been exceeded. The same approach applies for each additional threshold $SH_1$ which can be chosen every time with a sensor $C_1$ analogous to the sensor $C_2$ disposed at the distance $d_i$ corresponding to the threshold $SH_i$ relative to the point 7 on the reference surface 5.

FIG. 2 shows an example in which an envelope 2 is properly jogged along the reference surface 5 and presents a height $H_2$ less than SH. In this case, the sensor $C_2$ is never activated, and the apparatus delivers a value $L_2=0$, while the sensor $C_1$ serves to deliver a value $L_1$ defining the length $D_2$ of the envelope 2.

FIG. 3 shows an example in which an envelope 1 is properly jogged along the reference surface 5 and presents a height $H_1$ greater than SH. In this case, the sensor $C_2$ is activated for a time $t_2$ corresponding to a masking length $L_2$ equal the masking length $L_1$ determined on the basis of activation of the sensor $C_1$. The apparatus delivers information according to which the height $H_1$ is greater than the threshold SH and the sensor $C_1$ serves to deliver a value $L_1$ defining the length $D_1$ of the envelope 1.

The case of FIGS. 4 and 5 in which an envelope 3 is skew relative to the reference surface 5 is described above, and it is explained that the envelope 3 is considered as presenting a height $H_3$ that is less than the threshold SH, even though the sensor $C_2$ is activated for a time corresponding to a masking length $L_2$, provided that the values $t_2$ and $L_2$ are considerably less than the values $t_1$ and $L_1$ determined on the basis of the sensor $C_1$.

However, the sensor $C_1$ makes it possible to determine satisfactorily the length $D_3$ of the envelope 3 on the basis of the magnitude $L_1$ by giving the value of the magnitude $L_1$ to the length $D_3$, provided that the angle $\alpha$ is small and does not exceed about 5°.

Whether or not the envelopes 1, 2, 3 are slightly skew, the apparatus of the invention makes it possible to determine their lengths on the fly and to check their heights relative to a predetermined threshold SH, without it being necessary to re-align the skew envelopes manually provided that they have been jogged in part against the reference surface 5 of the envelope guide 4.

Figure 6:
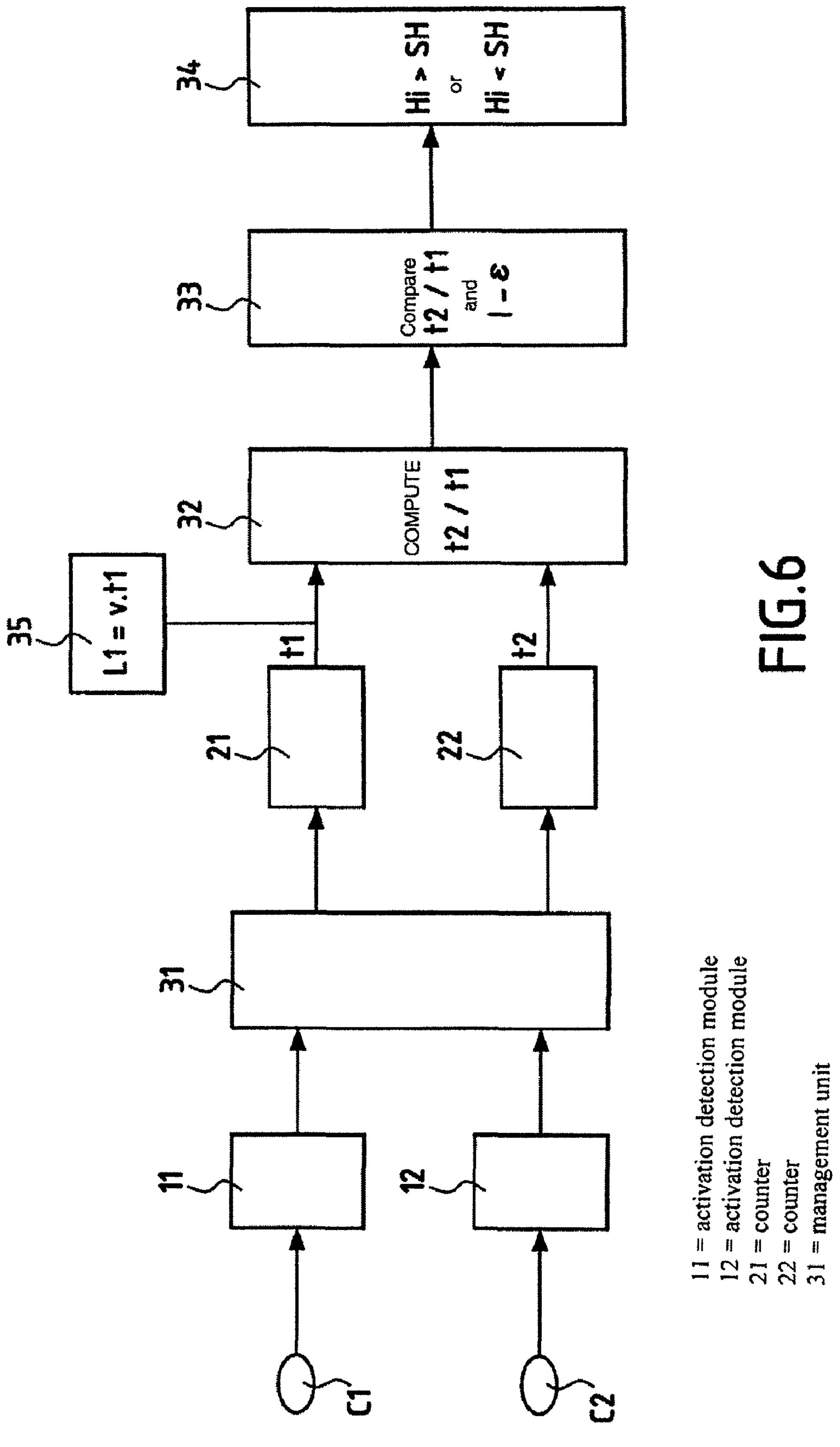
FIG. 6 is a block diagram showing the main elements of a processing circuit that can be incorporated into the apparatus of the invention.

An example of a processing circuit that can be implemented in the context of apparatus of the invention is described below with reference to FIG. 6.

Modules 11, 12 respectively detect activation of the sensors $C_1$ and $C_2$. The term "activation" is used herein to designate the state of the sensors $C_1$ and $C_2$ when a mail item goes past them and, for example, when the sensors are optical sensors, interrupts a light beam emitted by the sensors.

The modules 11, 12 responsive to activation of the sensors $C_1$ and $C_2$ respectively control a management unit 31 for managing counters 21, 22 which themselves deliver items of information $t_1$ and $t_2$ corresponding to respective ones of the times for which the same mail item remains facing the respective sensors $C_1$ and $C_2$.

The items of data $t_1$ and $t_2$ are applied to a module 32 for computing the ratio $t_2/t_1$, which ratio $t_2/t_1$ is applied to a module 33 for comparing the ratio $t_2/t_1$ with a value $1-\epsilon$. The output from the module 33 is applied to a module 36 delivering the information indicating whether or not the height $H_i$ of the mail item is greater than a predetermined threshold SH. A module 35 computes the masking length $L_1$ (to which the length $D_1$ of the envelope corresponds) on the basis of the value $t_1$ output by the counter 21 and of the value of the speed V of advance of the belt 6 of the conveyor.

Figure 7:
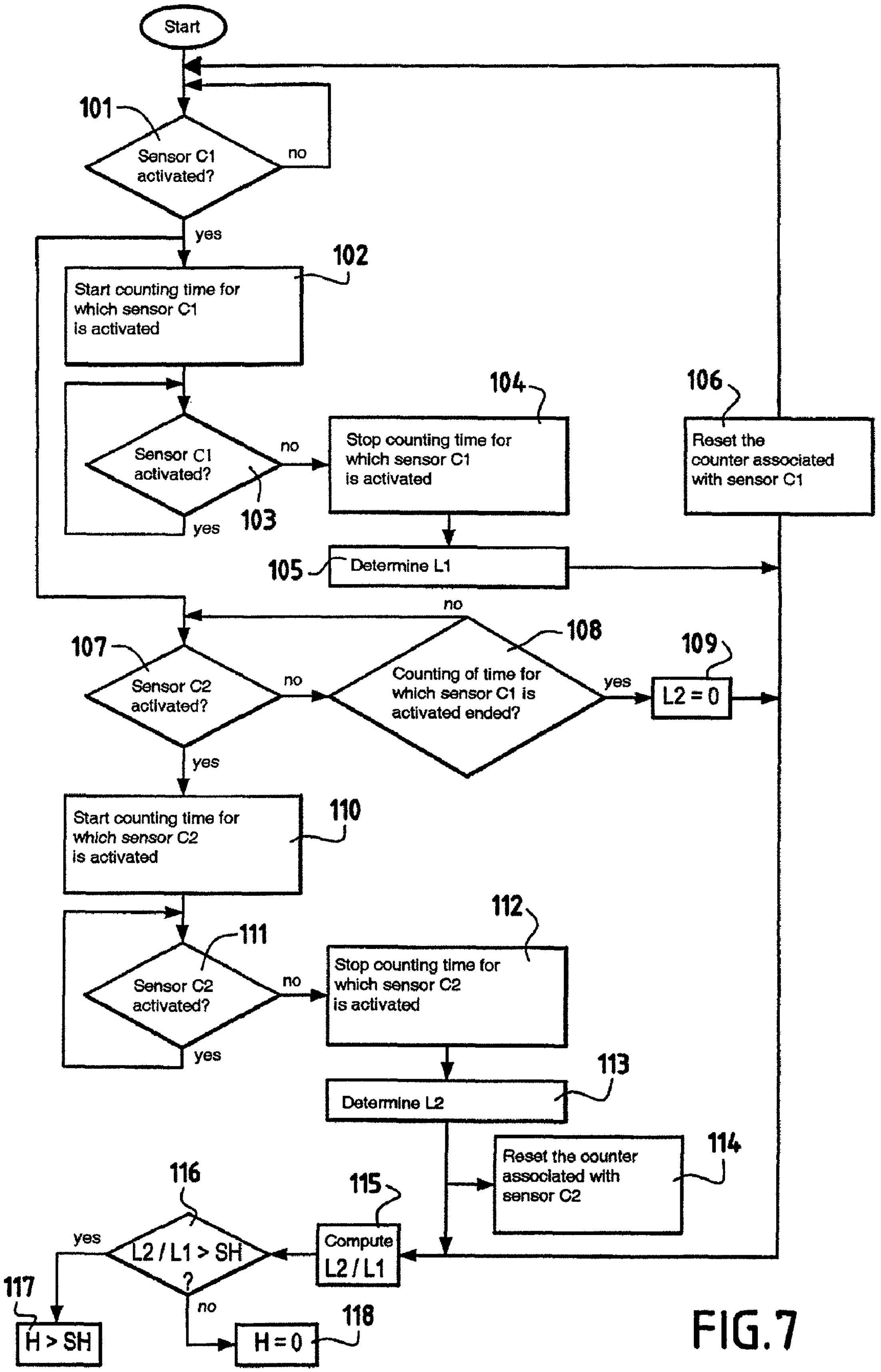
FIG. 7 is a flow chart showing an example of various steps implemented in the method of the invention for checking the height of a mail item on the fly.

An example of data processing using the method of the invention is explained below with reference to the flow chart of FIG. 7.

A test 101 examines whether the sensor $C_1$ is activated. If it is not activated, the processing returns to the input of the test 101. If the sensor is activated, the processing goes to the step 102 for starting counting of the time for which the sensor $C_1$ is activated, and then a test 103 examines whether the sensor $C_1$ is still activated. If sensor $C_1$ is determined to be active at test 103, the processing returns to the input of test 103. When the test 103 detects the end of activation of the sensor $C_1$, the processing goes to the step 104 for stopping counting of the time for which the sensor $C_1$ is activated, then to the step 105 for determining the value $L_1$, and then to a step 106 for resetting the counter associated with the sensor $C_1$. The output of step 106 is connected to the input of the test 101 for re-initializing the process.

The output of the test 101 is further connected to a test 107 which examines whether the sensor $C_2$ is activated. If it is not activated, a test 108 is applied in order to examine whether the counting of the time for which the sensor $C_1$ is activated has ended. If it has ended, a step 109 determines that the value $L_2$ is zero. Otherwise, the processing returns to the input of the test 107.

If the test 107 detects activation of the sensor $C_2$, the processing goes to a step 110 for starting counting of the time for which the sensor $C_2$ is activated. If the sensor $C_2$ is no longer activated as detected by test 111, the processing goes to a step 112 for stopping the counting of the duration of activation of the sensor $C_2$, and then to a step 113 for determining the value $L_2$ and to a step 114 for resetting the counter associated with the sensor $C_2$. The outputs of the steps 105, 109, 113 are connected to the input of a step 115 for computing the ratio $L_2/L_1$. Then, the processing goes to a test 116 for examining whether $L_2/L_1>SH$. If so, the step 117 displays H>SH; otherwise the step 118 displays H=0. If sensor $C_2$ is determined to be active at test 111, the processing returns to the input of test 111.

In addition, the output of step 106 is connected to the input of the step 101 in order to re-initialize the process after a mail item has been processed.

The invention is applicable to a system for determining postage values for franking mail, which system includes apparatus for measuring the weight and the dimensions of mail items, and incorporates apparatus as described above for checking the height $H_i$ of a mail item on the fly. The apparatus for measuring the weight on the fly can be disposed upstream or downstream from the apparatus for checking the height of a mail item on the fly.

What is claimed is:

1. A method of checking the height Hi of a mail item on the fly relative to at least one dimensional threshold SH defining a change in postage, each mail item having longitudinal peripheral edges of length Di and transverse peripheral edges of height Hi;

said method comprising:

causing the mail items to advance at a constant speed V along a reference surface so that each mail item is in contact with said reference surface over at least a portion of one of its longitudinal edges;

detecting the presence of a mail item relative to a given point of the reference surface firstly at a first distance d1 close to the reference surface and measured perpendicularly thereto, and secondly at a second distance d2 further away from the reference surface, measured perpendicularly thereto, and corresponding to said dimensional threshold SH;

detecting first and second times of presence t1, t2 for which the same mail item is present at said first and second distances d1, d2 relative to the reference surface;

comparing the ratio t2/t1 between the second and first times of presence at the second distance d2 and at the first distance d1 with a value equal to (1ε), where ε represents a correction coefficient of less than 1 that depends on the tolerances for detection of the presence of a mail item; and considering that the height H of a mail item is greater than the dimensional threshold SH if, and only if, the relationship t2/t1>1−ε is true.

2. A method according to claim 1, wherein the coefficient ε lies approximately in the range 0.005 to 0.05, and preferably in the vicinity of 0.01.

3. A method according to claim 1, further consisting in determining the length Di of a mail item on the basis of the time of presence t1 and of the speed of advance V of the mail items.

4. A device for checking the height Hi of a mail item relative to at least one dimensional threshold SH on the fly and for franking purposes, said at least one dimensional threshold defining a change in postage, each mail item having longitudinal peripheral edges of length Di and transverse peripheral edges of height Hi;

said apparatus comprising:

a conveyor for conveying mail items as laid flat at a constant speed V along a guide defining a reference surface parallel to the direction of advance of the mail items placed on the conveyor;

jogger means for placing each mail item in contact with said reference surface over at least a portion of one of its longitudinal edges;

a first detector device that is rendered active when the presence of a mail item is detected relative to a given point of the reference surface at a first distance d1 close to the reference surface and measured perpendicularly thereto;

at least one second detector device that is rendered active when the presence of a mail item is detected relative to a given point of the reference surface at a second distance d2 further away from the reference surface, measured perpendicularly thereto, and corresponding to said dimensional threshold SH;

a counter device for counting first and second times of presence t1, t2 for which the first and second devices are rendered active as a mail item is going past; and a computer and comparator device for computing the ratio t2/t1 between said second and first times, for comparing said ratio t2/t1 with a threshold value equal to (1−ε), where ε represents a correction coefficient of less than 1 that depends on the tolerances for detection of the presence of a mail item, and for delivering information indicating that the height Hi of a mail item is greater than the dimensional threshold SH if, and only if, the relationship t2/t1>1−ε is true.

5. Apparatus according to claim 4, wherein the coefficient ε lies approximately in the range 0.005 to 0.05, and preferably in the vicinity of 0.01.

6. Apparatus according to claim 4, wherein the first and second detector devices comprise optical sensors.

7. Apparatus according to claim 4, wherein the counter device comprises at least one optical encoder.

8. Apparatus according to claim 4, further comprising a device for computing the length Di of a mail item on the basis of the first time of presence ti and of the speed V of advance of the mail items.

* * * * *